Patented Nov. 17, 1942

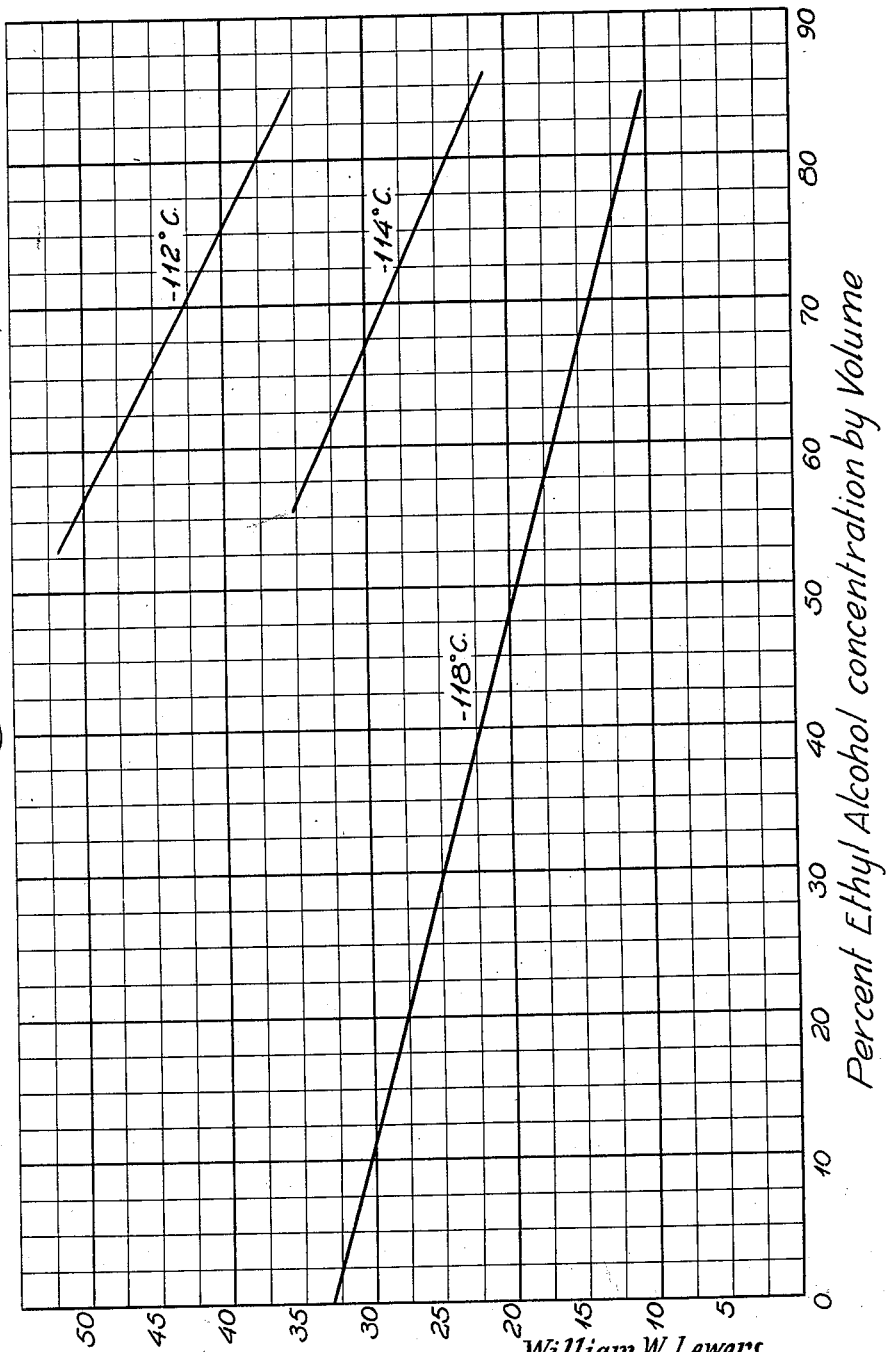

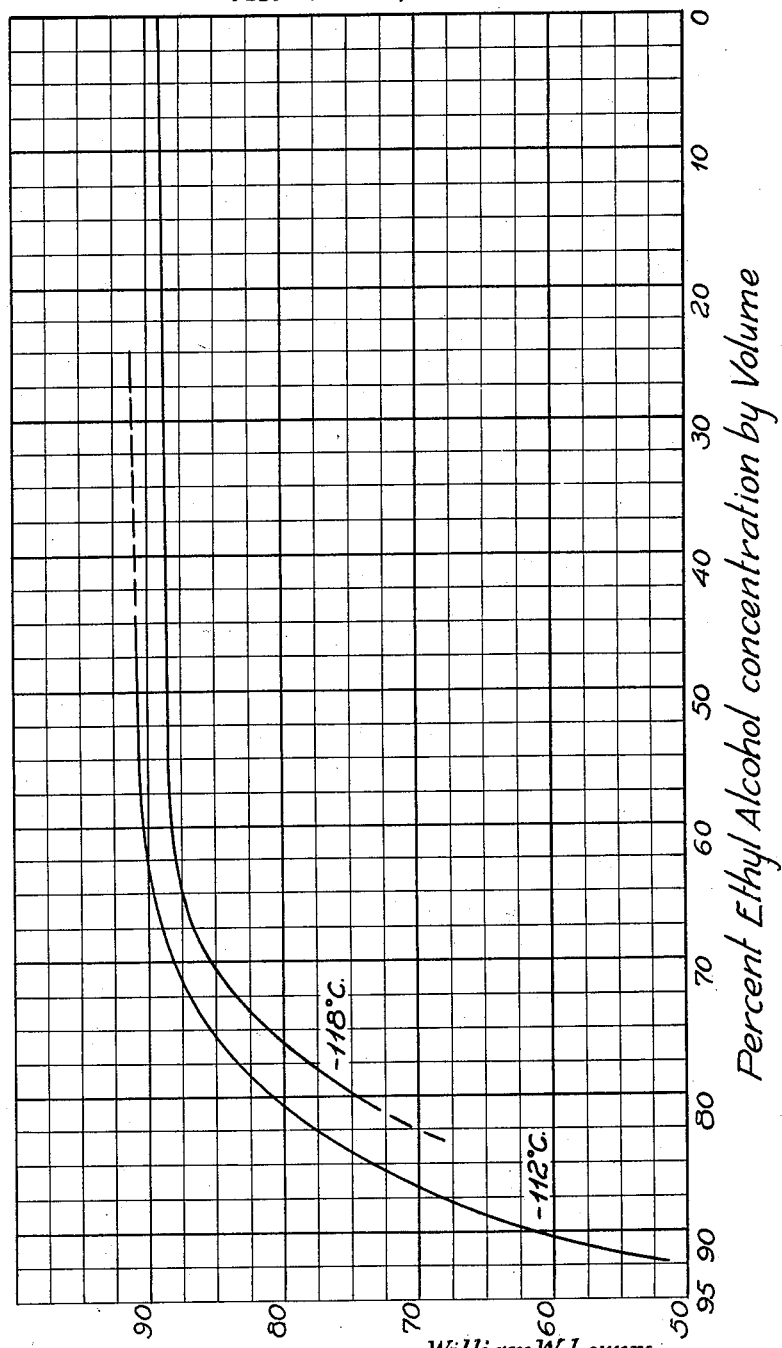

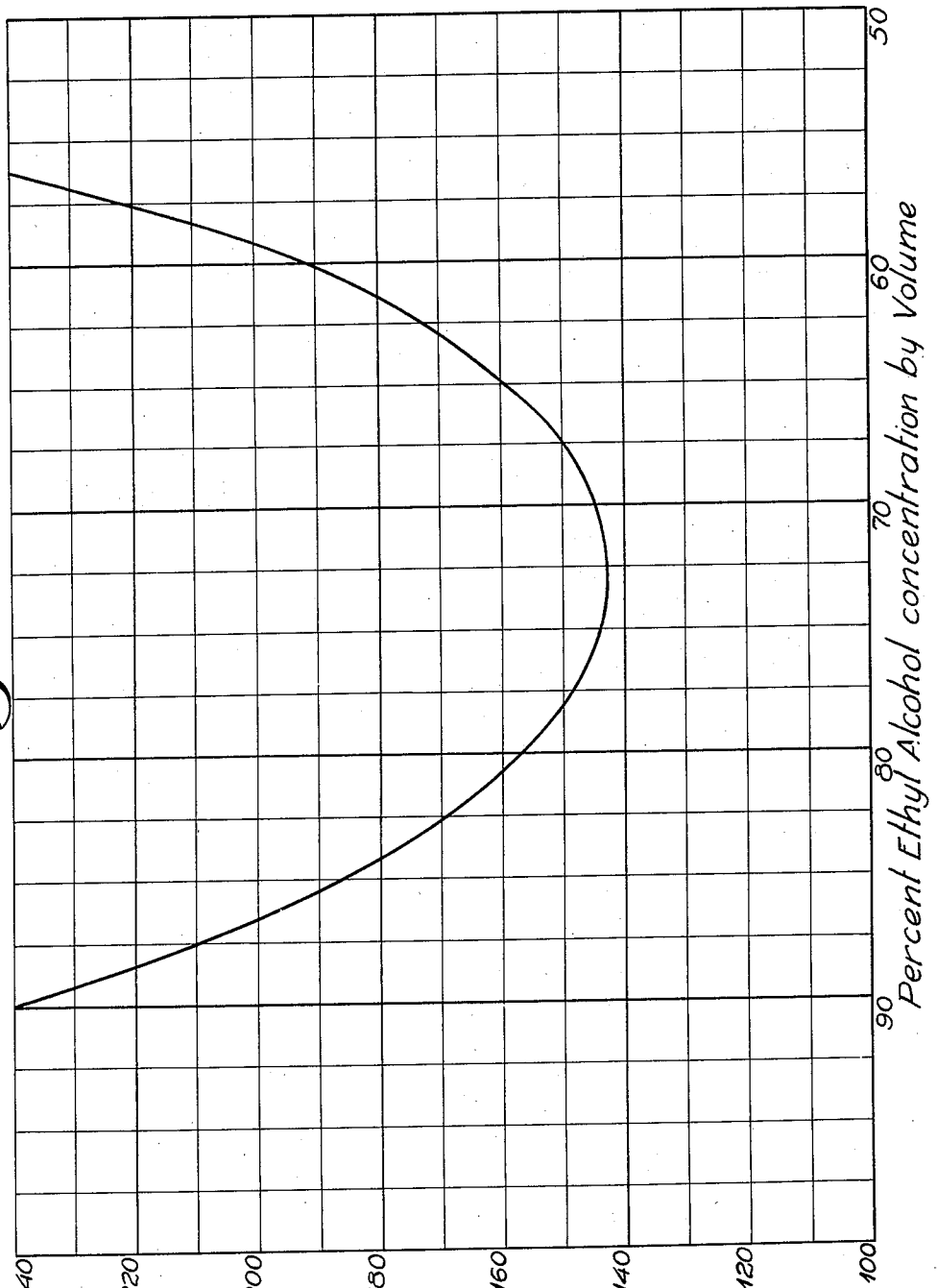

2,302,558

UNITED STATES PATENT OFFICE 2,302,558

TREATMENT OF SMOKELESS POWDER

William W. Lewers, Drexel Hill, Pa., and William A. Menges, Metuchen, and Earle C. Pitman, Red Bank, N. J., assignors to E. I. du Pont de Nemours & Company, Wilmington, Del., a corporation of Delaware Application June 28, 1940, Serial No. 342,896

8 Claims. (Cl. 260—223)

This invention relates to nitrocellulose and more particularly to smokeless powder which has become deteriorated and discolored as the result of long storage, and still more particularly to a process for reclaiming smokeless powder for use in industrial coatings.

Smokeless powder represents nitrocellulose having a nitrogen content of about 12.6% which has been gelatinized or colloided with a mixture of ether and ethyl alcohol together with stabilizing agents. The colloided mass is finally extruded into suitable form. Following the extrusion, the powder is dried to remove the major portion of the volatile solvent and placed in containers for military use. Large quantities of smokeless powder, left over from the World War, have been utilized by the lacquer and coated fabric industry, so that its industrial importance has assumed that of a basic raw material. The military life of smokeless powder may be as long as 20 years, and at the end of this period its ballistics properties have changed sufficiently to make it advisable to discard it. It is the processing of smokeless powder which has become discolored during storage to which this invention relates. It is well known that the viscosity characteristic of the nitrocellulose present in the smokeless powder is too high for most industrial lacquer uses, and also due to the presence of the stabilizer, diphenylamine, considerable color develops in the powder during its long storage life. Most of this color must be removed before incorporation into lacquers.

Processes have been described for the reduction of viscosity by heating in inert liquids. Also the removal of the color by means of organic liquids such as ethyl alcohol or toluol has been disclosed to the public. However, with the continual improvement in quality of lacquers has come a demand for lower and lower viscosity types of nitrocellulose coupled with demands for even lighter colored products than it has been possible to heretofore produce by the methods disclosed in the prior art.

This invention has as an object an improved process for treating deteriorated smokeless powder to produce a grade of nitrocellulose suitable for the preparation of lacquer coatings of the low viscosity type. A further object is an improved process designed to reduce viscosity and simultaneously remove the color from the smokeless powder without marked loss of or granulation of the powder grains. A further object is to provide a safe, economical process and a stable final product. A still further object is to provide conditions under which the smokeless powder is substantially insoluble whereby high yields of the final product are obtained. A still further object is to secure optimum rates of viscosity reduction, color removal and yield.

These objects are accomplished by heating smokeless powder under pressure in the temperature range of 105° to 120° C. in the presence of ethyl alcohol-water solutions, adjusted in concentration to reduce the solvent power to a minimum at the temperature of digestion, while still maintaining the high color-removing power of the ethyl alcohol and continuously venting from the pressure vessel the non-condensible gases formed.

In the drawings Figure 1 is a graph in which the time to reduce the viscosity of smokeless powder to a characteristic below 200 is plotted against per cent of ethyl alcohol by volume in aqueous solution. Figure 2 is a graph in which yield of low viscosity material is plotted against per cent of ethyl alcohol by volume in aqueous solution. Figure 3 is a similar graph in which color is plotted against per cent alcohol.

It is an established fact in the heating of nitrocellulose or smokeless powder in the presence of an inert liquid such as alcohol or water, that the higher the temperature of the digestion, the greater the viscosity drop secured in a given time, or conversely, the shorter the time required to reach any desired viscosity characteristic. This is shown in Figure 1 where the curves are isothermal and isoviscous. It will be seen that at any concentration of dilute alcohol, the time required to reduce the viscosity to the constant viscosity of about 55 centipoises represented by all these curves was greatly affected by the temperature. For instance, when using ethyl alcohol at a concentration of 65% by volume, 45½ hours were required at 112° C., 31 hours at 114° C. and only 15½ hours at 118° C. When the temperature used is below 105° C., the time required to reduce the viscosity to values below 200 centipoises* becomes excessive and the process is relatively uneconomical. If the temperature is further reduced below 100° C. it is practically impossible to reduce the viscosity characteristic of the smokeless powder below 200 centipoises.

---

*All viscosity determinations in this specification are expressed as centipoises at 25° C. of a solution of the smokeless powder having the following composition:

| | Per cent by weight |
|---|---|
| Smokeless powder (dry) | 15.0 |
| Ethyl alcohol (95% by vol.) | 17.0 |
| Toluol | 25.5 |
| Ethyl acetate (99% by wt.) | 42.5 |
| | 100.0 |

The incomplete solubility of the reduced viscosity smokeless powder in the standard A. S. T. M. method D-36-301 formulas, precludes the use of this method. A viscosity characteristic of 3300 centipoises in the formula disclosed is approximately equivalent to 4.6 seconds (1735 centipoises) in Formula A—A. S. T. M. D-36-301.

Also, all color determinations were made using the above solution and comparing its color with the standards set up in A. S. T. M. method D-39-365. In this system the higher the number the darker is the color of the sample.

Figure 1 also shows that as the concentration of alcohol in the dilute solution is increased, the speed of viscosity reduction also increases. A typical pressure treatment with water at 118° C. requires 33 hours to produce a final viscosity of 55 centipoises. A similar digestion made with 73% alcohol by volume requires only 13½ hours to reach the same viscosity.

It would appear that a viscosity reduction in the presence of 95% ethyl alcohol or absolute ethyl alcohol would represent the most economical and fastest means of reducing the viscosity characteristic of the nitrocellulose, but we have found that, while smokeless powder can be treated with 95% ethyl alcohol at 80° C., that is, under atmospheric pressure conditions without dissolving appreciable quantities of the smokeless powder or causing its disintegration, as the temperature of the treatment is increased, the solubility of the smokeless powder increases rapidly, so that it is not practicable to use concentrations of ethyl alcohol above 80% by volume when working in the temperature range of 105° C. to 120° C. Figure 2 shows this effect very clearly. The yield represents the amount of treated powder remaining after a pressure digestion which reduced the viscosity characteristic of the nitrocellulose to approximately 55 centipoises. Pressure digestion of smokeless powder in water to give low viscosities in the range of 55 centipoises has been used commercially for some time, and it has been found that yields from 88% to 90% have been obtained. Such a yield value is, however, highly artificial in that following the reduction of viscosity, subsequent treatments with hot 95% ethyl alcohol are necessary in order to remove the color from the powder. This operation is normally carried out by heating the powder in sufficient 95% ethyl alcohol at or near the boiling point of the alcohol for several hours. Normally, several such treatments are necessary following the pressure digestion with water in order to give a final product sufficiently light in color to allow its use in coating compositions. The final yield of light-colored powder resulting from the combined water and alcohol extraction treatment is about 82%.

We have now found that pressure digestions with dilute alcohol have a great advantage over the water digestion in that we simultaneously reduce viscosity and extract color. For example, a pressure digestion with 65% ethyl alcohol by volume will produce yields of approximately 89%, while pressure digestion with 80% ethyl alcohol by volume will produce yields of approximately 80%. The color of the powder at the end of this pressure digestion cycle is light enough to permit the use of the powder directly in coating compositions, although it is normal practice to wash the greater portion of dilute alcohol out with warm or hot 95% ethyl alcohol. This operation is a dehydration process and is a step which is characteristic of the commercial handling of all nitrocellulose as the presence of an excessive amount of water must be avoided in coating compositions.

We have further found that by increasing the concentration of the dilute ethyl alcohol above 80% by volume, the yields drop off very rapidly until at a concentration of 95% by volume the yield is less than 50%, as is shown by Figure 2. Further, the use of alcohol concentrations above 80% by volume, when using temperatures in the range of 105° C. to 120° C., will cause serious granulation or disintegration of the powder, and as the concentration of the alcohol approaches 100%, more and more colloiding or gelatinization of the smokeless powder occurs. Both granulation and colloiding are effects which seriously interfere with the ready commercial utilization of the powder. However, the low yields at high concentrations of alcohol represent an even more serious economic effect than does the breaking up of the coarse pellets of powder.

We have found still another serious effect occurs when using alcohol concentrations above 80% by volume. This effect is shown by Figure 3 which is a graphic representation of the ability of ethyl alcohols of varying concentration to extract color from smokeless powder during the pressure digestion. The curve has been plotted from data secured in pressure digestions carried out at 112° C. The shape of the curve is entirely unexpected and could not be predicted prior to the carrying out of a series of controlled experimental digestions. The curve shows that 95% ethyl alcohol by volume removes color much less effectively than alcohol concentrations in the range of 65% to 80% by volume. The optimum alcohol concentration has been found by these experiments to lie at approximately 73% ethyl alcohol by volume. This, therefore, represents the preferred alcohol concentration. The combination of the data of Figures 2 and 3 shows that alcohol concentrations in the range of 65% to 80% are the most effective concentrations in treating powder.

The use of temperatures above 120° C. is possible, and commercial products may be obtained by such treatment. These higher temperatures result in a more rapid viscosity drop but would at the same time require the use of aqueous alcohol at the lower end of our critical range in order to prevent greater losses than are characteristic of the temperature range of 105° C. to 120° C.

The production of treated smokeless powder in the intermediate low viscosity range, for example, 125 centipoises, would require only a short interval of heating at 125° C. This short cycle of treatment would in certain instances fail to remove sufficient colored products to give a treated powder satisfactory for many uses. It would, therefore, be necessary to carry out further extractions at atmospheric temperature or at temperatures below that at which appreciable further viscosity reduction occurs. Therefore, it can be seen that temperatures above 120° C., while increasing the speed of viscosity reduction, tend to handicap the process of color removal, while maintaining a good yield. Still another condition limits the use of temperatures above 120° C. It is commonly recognized that the decomposition point of nitrocellulose is approximately 135° C. This point of serious decomposition varies considerably depending upon a number of factors, of which one of the most important is the removal of the products of decomposition during any heat treatment. Temperatures above 120° C. introduce some hazard but this is not particularly serious until temperatures above 130° C. are reached. The higher the temperature used, the greater is the volume of non-condensible gases formed, which makes difficult the maintenance of a constant pressure. Therefore, the use of temperatures of 120° C. or lower makes the process safer to carry out than when attempting to use temperatures substantially above 120° C. While we prefer to operate in a temperature range between 105° C. and 120° C., under certain circumstances we can operate under a temperature as high as 130° C., or even slightly above.

The process described is designed to produce grades of treated smokeless powder having viscosity characteristics below 3300 centipoises at 25° C. (approximately equivalent to 4.6 seconds Hercules or A. S. T. M. method D–36–301, Formula A). Treatment of high viscosity smokeless powder with aqueous alcohol in the range of 65–80% by volume to give a viscosity characteristic below 3300 centipoises and more particularly below 200 centipoises cannot be carried out effectively at temperatures below 100° C., except when excessively long treatments are used. The great majority of smokeless powder used in lacquers has been treated to give viscosities well below 200 centipoises. We, therefore, prefer to limit ourselves to the production of smokeless powder having a viscosity characteristic less than 3300 centipoises and references to low viscosity are in line with this definition.

The following examples are illustrative and produce a grade of treated powder acceptable for commercial use and having a viscosity characteristic allowing the formulation of coating materials with high solids content. The treated powder is also exceptionally light in color, and in at least one instance is lighter in color than has been heretofore produced by the combined water pressure digestion method coupled with subsequent hot extractions with 95% ethyl alcohol.

Example 1

259 pounds of water-wet smokeless powder of the type used for 155 mm. guns, and having a moisture content of 7.6%, were charged into a 50 gallon steam-jacketed autoclave. The powder had a viscosity characteristic of approximately 48,000 centipoises and a color of about 650.

32½ gallons of 75% ethyl alcohol by volume, which had been heated to 70° C., were added to the charge, the autoclave closed and the temperature gradually raised to 112° C. by introducing steam into the jacket of the autoclave. The pressure within the autoclave was maintained at a maximum gauge pressure of 44 pounds per square inch. The non-condensible gases formed during the heating were continuously vented by opening a valve in the dome of the autoclave just enough to maintain a 44 pound gauge pressure. At the end of a 4-hour digestion period, that is, four hours after the charge had actually reached a temperature of 112° C., the charge was cooled to 70° C. and the contaminated, dilute alcohol drained off and replaced with clean hot 73% ethyl alcohol. Replacement of the contaminated alcohol was also effected after additional digestion periods of 8, 8, 8 and 12 hours, respectively, making a total digestion period of 40 hours. The resultant product exhibited a viscosity characteristic of 60 centipoises and a color rating of 145. The powder grains were firm and the yield obtained was found to be 86%.

Example 2

5200 pounds of 155 mm. powder having a moisture content of 11.0%, were treated with 95% ethyl alcohol at 70° C. to 75° C. for 2 hours and at 76° C. to 78° C. for 10 hours to stabilize it. This pre-stabilization is a desirable procedure and is important as a means of preventing any serious decomposition of badly deteriorated powder in the autoclave under pressure. This treatment has little or no effect upon the viscosity characteristic of powder. It does extract some color, and while not essential in the carrying out of our invention, is a permissible step which increases the safety of the pressure digestion step.

Following the pre-stabilization, the charge of powder was placed in a steam-jacketed autoclave of 1000 gallons capacity. The powder at this point had a viscosity characteristic of approximately 48,000 centipoises and a color of slightly less than 650. 688 gallons of 72.9% ethyl alcohol by volume were added, the autoclave closed and the temperature gradually raised to 118° C. The pressure was maintained at a maximum of 55 pounds per square inch, and this pressure was kept contant by continuously venting non-condensible gases formed in the treatment. At the end of a 13-hour digestion period, the charge was cooled to 70° C. and the contaminated alcohol drawn off. At this point the treated powder had a viscosity characteristic of 52 centipoises and a color of 200 with a yield of 82.5%.

This charge of powder was then given 4 one-hour dehydration treatments at 70° C. to 75° C., each treatment employing 400 gallons of 95% ethyl alcohol by volume. These final treatments had only a slight effect upon the viscosity characteristic of the powder but further reduced the color content and removed water to the point that the alcohol-wet powder could be immediately made into finished lacquers. At the conclusion of the dehydrating treatments, the powder had a viscosity characteristic of 55 centipoises and a color of 150. A yield of 77.5% was secured.

Example 3

314 pounds of 155 mm. powder, having an original moisture content of 11.3%, were pre-stabilized with 95% ethyl alcohol at 70° C. to 75° C. for 2 hours plus 10 hours at a temperature of 76° C. to 78° C. The pre-stabilized powder was then charged into a 50 gallon steam-jacketed autoclave. The powder at this point had a viscosity characteristic of approximately 48,000 centipoises and a color of approximately 500.

25 gallons of 74.3% ethyl alcohol by volume, which had been previously heated to 70° C., were added to the charge and the temperature raised to 118° C. by introducing steam into the jacket of the autoclave. The pressure at this temperature was found to be 55 pounds per square inch. This pressure was maintained by continuously venting non-condensible gases formed during the treatment. The pressure and temperature was maintained for 13 hours during which period the alcohol in the charge was continuously replaced with clean 73% by volume ethyl alcohol which had been previously heated to 118° C. before introduction into the autoclave. Sufficient contaminated alcohol was continuously removed to maintain the volume of treating liquid constant. Replacement of the alcohol was accomplished by pumping it in under a pressure slightly higher than that in the autoclave. A total of 118 gallons of clean 73% ethyl alcohol was pumped into the autoclave during the pressure cycle. At the end of the cycle the charge was cooled to 70° C. and the autoclave drained.

At the end of this treatment, the powder had a viscosity of 69 centipoises and a color of 115. The pellets of powder were firm, and while larger than the raw powder used, were not swollen sufficiently to indicate any serious degree of gelatinization. An over-all yield of 82.0% was secured.

*Example 4*

272 pounds of 155 mm. powder, on a dry basis, which had been previously stabilized by a 2-hour treatment at 70° C. to 75° C. with 95% ethyl alcohol by volume and a subsequent treatment for 10 hours at 76° C. to 78° C., were placed in a steam-jacketed autoclave. 27 gallons of 65% by volume ethyl alcohol heated to 76° C. were introduced, the autoclave closed and the temperature raised to 118° C. by introducing steam into the jacket of the autoclave. A gauge pressure of 44 pounds per square inch was maintained by continuously venting from the autoclave the non-condensible gases formed during the pressure treatment. The digestion was continued for 14½ hours, and during the digestion fresh 65% by volume ethyl alcohol was pumped in slowly at a temperature and pressure slightly above that existing within the autoclave. An equivalent amount of contaminated alcohol was withdrawn from the lower part of the autoclave. A total of 131 gallons of fresh alcohol was added during the process of the digestion or, in other words, 158 gallons of 65% ethyl alcohol by volume were used to treat 272 pounds of powder. At the end of the cycle the charge was cooled and it was found that the viscosity characteristic of the treated powder was 64 centipoises and the treated powder had a color of 140. A yield of 87.4% was obtained at this point.

In order to prepare the batch of treated smokeless powder for use in the preparation of lacquers, a single dehydrating treatment with 95% alcohol was given. This was carried out for a period of one hour at a temperature of 76° C. to 78° C. At the end of the dehydration treatment the viscosity characteristic of the powder was found to be 70 centipoises and the color was found to be 130. The over-all yield had dropped to 85.4%. The increase in viscosity characteristic brought about by the dehydrating treatment was presumably due to the extraction of certain low viscosity components from the nitrocellulose by the hot 95% ethyl alcohol.

Examples 3 and 4 represent the preferred procedure in that fresh hot dilute alcohol is continuously added to the system, and a portion of the alcohol in the charge which is contaminated with the color extracted from the powder is removed. In this way the concentration of the color in the dilute alcohol is kept at a low value. This causes a more rapid extraction of the color and also makes it possible to obtain a lighter color in a given treating time. Example 2 illustrates the effect of using a single charge of alcohol in the pressure digestion where after a 13-hour pressure digestion at 118° C., a color of 200 was reached as compared with a color of 115 in Example 3 which was carried out under the same temperature and pressure conditions and at the same alcohol concentration. It has been found that the removal of the greater portion of the color in smokeless powder is readily effected, but removal of the last traces of color is extremely difficult.

The principle of using an excess of dilute alcohol during the extraction, either through a continuous replacement or through a batch process, as is illustrated in Example 1, is a fundamental one and is effective regardless of the other conditions under which the pressure digestion is carried out.

Experiments have shown that the continuous pump replacement system is superior to the batch system inasmuch as it has been found that if dilute alcohol contaminated with the colored products of smokeless powder is allowed to cool from 118° C. to approximately 78° C., a certain proportion of the color tends to return to the nitrocellulose. This is presumably due to the fact that the coloring materials are less soluble at the lower temperature. In carrying out the batch process, it is necessary to cool in order to remove the liquor from the autoclave, and even though the removal of the contaminated liquor is carried out rapidly, some re-contamination of the powder occurs. Also, time is lost in the cooling, draining, recharging and reheating operations.

A modification of the process, and one involving further use of the preferred alcohol concentrations in the range of 65% to 80% by volume, is carried out as follows: A suitable charge of smokeless powder is first heated under pressure for a period of time necessary to bring the viscosity characteristic to a desired point, for example, 55 centipoises, the pressure digestion being carried out in the temperature range of 105° C. to 120° C. At the end of the viscosity reduction cycle, the pressure is reduced in the kettle to bring the temperature of the charge down to a point below 105° C., for example, 100° C. and the conditions maintained at this temperature, preferably while introducing fresh alcohol of the same concentration and temperature to the batch. It has been found, when the viscosity characteristic of the nitrocellulose has been reduced below about 70 centipoises, that continued treatment at 100° C. with alcohol in the range of 65% to 80% by volume fails to further effectively reduce the viscosity. Therefore, the second stage of this process enables us to utilize the most efficient type of dilute alcohol and to reduce the color content of the smokeless powder to a greater extent than is possible during the viscosity-reducing stage of the treatment. Following the treatment at approximately 100° C. with dilute alcohol, it is necessary in most cases to dehydrate with 95% ethyl alcohol, as has been described above.

We prefer, in most instances, to make use of a set of conditions such that the yield is kept above 80%. It is possible when using a temperature of 120° C. and an alcohol concentration of 80% by volume to obtain a product very low in viscosity, of good color, but the yield will be found to be substantially below 80%. The types of nitrocellulose used in commercial coatings have a wide range, and for certain types of coatings such as dark colored pigmented enamels, a smokeless powder fairly dark in color can be used. Where white enamels or light tints are to be manufactured, it becomes necessary to produce a smokeless powder substantially free from color. Many unsuccessful attempts have been made to produce a treated smokeless powder having the color characteristics of a cotton cellulose directly nitrated to the viscosity and solubility characteristics desired. This goal has not been reached, and it is in this respect that our preferred conditions represent a marked advance in the art.

By our process it is possible to produce products having exceptionally low viscosity characteristics, and indeed a viscosity characteristic too low for commercial coating purposes can be readily prepared. In addition to the reduction of viscosity, the process disclosed permits a more complete removal of the colored products normally present in the smokeless powder than has been heretofore possible. The process also avoids excessive loss and allows the treatment to proceed with yields of at least 80% without seriously breaking down the powder pellets or causing serious swelling and gelatinization. The process is further of great commercial value in that it permits the production of usable grades of treated powder in simple, readily available equipment, and the processing time is kept at a minimum and substantially below that necessary when working with water as the treating liquid. The preferred range of alcohol concentrations; namely, 65% to 80%, represents a zone, the properties of which are entirely unexpected in that the color-extracting power is here at a maximum and in this zone the color-extracting power is greater than that of any other concentration of ethyl alcohol and water, even including absolute ethyl alcohol.

It is apparent that many widely different embodiments of this invention may be made without departing from the spirit and scope thereof; and, therefore, it is not intended to be limited except as indicated in the appended claims.

We claim:

1. The process of treating smokeless powder to reduce its viscosity characteristic to a value below 3300 centipoises and to remove color, which comprises heating the said smokeless powder under pressure at a temperature of about 105° C.–130° C. in a mixture consisting essentially of water and ethyl alcohol, the concentration of the said alcohol being in the range of 65% to 80% by volume.

2. The process of treating smokeless powder to reduce its viscosity characteristic to a value below 3300 centipoises and to remove color, which comprises heating the said smokeless powder under pressure at a temperature of about 105° C.–130° C. in a mixture consisting essentially of water and ethyl alcohol, the concentration of the said alcohol being in the range of 65% to 80% by volume while continuously venting the non-condensable gases formed at such a rate that a substantially constant pressure is maintained.

3. The process of treating smokeless powder to reduce its viscosity characteristic to a value below 3300 centipoises and to remove color, which comprises heating the said smokeless powder under pressure at a temperature of about 105° C.–120° C. in a mixture consisting essentially of water and ethyl alcohol, the concentration of the said alcohol being in the range of 65% to 80% by volume while continuously venting the non-condensable gases formed at such a rate that a substantially constant pressure is maintained.

4. The process of claim 3 in which the pressure is of the order of 50 pounds per square inch.

5. The process of claim 3 in which a portion of the treating liquid is removed and approximately the same amount of fresh aqueous alcohol is added to maintain a constant volume of treating liquid.

6. The process of treating smokeless powder to reduce its viscosity characteristic to a value below 3300 centipoises and to remove color, which comprises heating the said smokeless powder under pressure at a temperature of about 105° C.–130° C. in a mixture consisting essentially of water and ethyl alcohol, the concentration of the said alcohol being in the range of 65% to 80% by volume, and continuing the treatment until the viscosity of the smokeless powder has been reduced to below 200 centipoises.

7. The process of treating smokeless powder to reduce its viscosity characteristic to a value below 3300 centipoises and to remove color which comprises heating the said smokeless powder in a mixture consisting essentially of 73% by volume of ethyl alcohol and water at a temperature of about 105° C.–130° C., under a pressure of about 50 pounds per square inch.

8. The process of treating smokeless powder which comprises heating the said powder under a pressure in a liquid consisting essentially of 65% to 80% by volume of ethyl alcohol and from 20% to 35% by volume of water at a temperature between about 105° C.–120° C. until the viscosity characteristic below 200 centipoises has been reached, draining the treating liquid and subsequently heating the smokeless powder in 95% alcohol at a temperature of about 70 to 78° C. and thereafter separating the alcohol from the smokeless powder.

WILLIAM W. LEWERS.
WILLIAM A. MENGES.
EARLE C. PITMAN.